April 26, 1932.  F. M. CASE  1,855,738

FISHING REEL

Original Filed June 2, 1922

Inventor

Francis M. Case

By Brockett & Hyde

Attorneys

Patented Apr. 26, 1932

1,855,738

UNITED STATES PATENT OFFICE

FRANCIS M. CASE, OF CLEVELAND, OHIO, ASSIGNOR TO THE ENTERPRISE MFG. CO., OF AKRON, OHIO

FISHING REEL

Original application filed June 2, 1922, Serial No. 565,377, now Patent No. 1,637,437, dated August 2, 1927. Divided and this application filed June 27, 1927. Serial No. 201,740.

This invention relates to improvements in fishing reels, the present application being a division of my prior patent for fishing reels, dated August 2, 1927, No. 1,637,437.

The general object of the present invention is the provision of an improved spool structure for fishing reels, said structure embodying a die cast spool member mounted upon and adapted for rotation with a steel spool shaft, with the openings for attaching the line to the spool structure extending through an annular enlargement of the spool member in spaced relation to the spool shaft. Said openings are therefore not only simple and easy to form but inasmuch as said openings are spaced from the steel spool shaft, the line is never damaged by the rusting of said shaft.

Further objects of the invention are in part obvious and in part will appear more in detail hereinafter.

Figure 1:
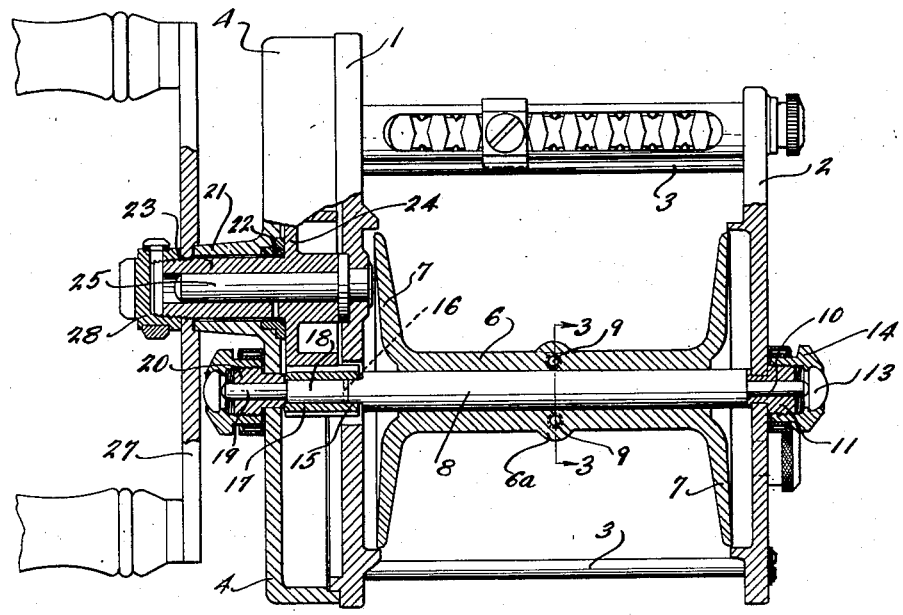
Figure 2:
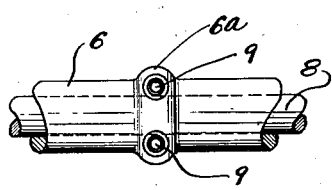
Figure 3:
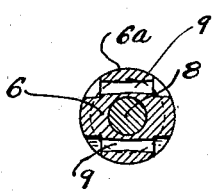

In the drawings, Fig. 1 is a side elevation of a fishing reel embodying my invention, with the spool structure and its driving mechanism in section, the real click structure, which is shown in the above referred to application, being here omitted for simplicity of illustration; Fig. 2 is a side elevation of the middle portion of the spool structure; and Fig. 3 is a detail cross-sectional view on the line 3—3, Fig. 1, and showing the line attaching openings.

The fishing reel illustrated in the drawings comprises a suitable frame including end plates or heads 1, 2 connected by pillars 3, with a hollow gear casing 4 suitably attached to the end plate or head 1. Rotatably mounted between said plates or heads is a line receiving spool, which includes a spool member having a sleeve portion 6 and two slightly flaring but comparatively flat heads 7. The sleeve portion 6 and the heads 7 of the present spool member are of integral construction, said spool member, as well as the reel end plates 1, 2 and the reel casing 4, being made of die castings, which enables these parts to be accurately cast to form without the necessity of turning or other finishing operations, which materially reduces the cost of the reel. Extending through the sleeve portion 6 of this proof member is a hardened steel spool shaft 8, of relatively hard metal, said spool member being fast on said shaft so that it will rotate therewith.

The spool structure is provided with line receiving holes, or openings which extend through the sleeve portion 6 of the spool member in spaced relation to the hard steel spool shaft 8. Said openings are therefore not only easy and simple to form but there is no liability of the line contacting with the spool shaft and being damaged thereby when said shaft becomes rusted. In the specific embodiment of the invention here illustrated, the two line attaching openings 9 are arranged in balanced relation on opposite sides of the spool shaft and extend through an annular enlargement 6a of the spool sleeve portion located at substantially the middle thereof. The balancing of the spool by the provision of two line attaching openings on opposite sides and preferably at substantially the middle of the spool shaft is of the greatest importance for without such a balance, good casting is extremely difficult if not impossible. Enlarging the spool sleeve portion to receive these line attaching openings is also quite important as it permits said openings to be made large enough to enable a line to be conveniently secured therein and yet, the line receiving capacity of the spool is not materially reduced, as it would be if the sleeve-portion of the spool were enlarged throughout its entire length.

One of the projecting end portions of the spool shaft 8 is reduced at 10 and rotates in a bearing member 11 suitably attached to the reel end plate or head 2. End play is received and taken up by an agate or other hardened end bearing 13 in a cap 14 threaded upon the bearing member 11.

The other projecting end portion of the spool shaft is first flattened off on two sides, as at 15, for driving connection in a transverse recess 16 in the end of a small pinion 17, is then reduced to cylindrical form at 18 where the shaft passes through the opening in said pinion, and is again reduced at 19 for support in an end bearing structure 20 similar to the one at the opposite end of the spool shaft.

The gear casing 4 is provided with an outwardly extending tubular boss 21 in which is arranged a hardened steel bushing 22. Through this bushing and boss projects a hollow or sleeve-like extension 23 of the main driving gear 24 which meshes with and drives the pinion 17 on the spool shaft. The gear 24 is rotatably mounted upon a stub shaft 25 suitably secured to the head plate 1, and is driven by a handle 27 secured by a cap nut 28 to a square portion of the gear extension 23. By turning the handle 27, the spool may be driven in either direction, as will be readily understood.

Having described my invention, I claim:

In a fishing reel, a line receiving spool comprising a hardened steel shaft and a die cast spool member mounted thereon for rotation therewith, said spool member having a pair of relatively flat heads connected by a sleeve portion having a uniform bore through which said shaft extends and in which said shaft fits and is secured, said sleeve portion being provided intermediate its ends with an annular, outwardly projecting enlargement through which extend two line attaching openings arranged in balanced relation on opposite sides of the spool shaft but spaced outwardly therefrom so that the line can not come into contact therewith and be damaged thereby.

In testimony whereof I hereby affix my signature.

FRANCIS M. CASE.